(12) United States Patent
Danford (10) Patent No.: US 9,513,118 B2
(45) Date of Patent: Dec. 6, 2016

(54) STRAIN GAGE DEVICE AND METHOD (71) Applicant: Honda Motor Co., Ltd., Tokyo (JP)

(72) Inventor: Kevin Danford, Columbus, OH (US)

(73) Assignee: Honda Motor Co., Ltd., Tokyo (JP)

( * ) Notice: Subject to any disclaimer, the term of this patent is extended or adjusted under 35 U.S.C. 154(b) by 415 days.

(21) Appl. No.: 14/068,736

(22) Filed: Oct. 31, 2013

(65) Prior Publication Data

US 2015/0113783 A1 Apr. 30, 2015

(51) Int. Cl.
*B25B 27/14* (2006.01)
*G01B 21/32* (2006.01)
*G01B 21/04* (2006.01)

(52) U.S. Cl.
CPC .............. *G01B 21/32* (2013.01); *G01B 21/047* (2013.01); *Y10T 29/53961* (2015.01)

(58) Field of Classification Search
CPC ........ G01B 21/32; G01B 21/047; B23P 19/10; Y10T 29/53961
USPC ........ 269/71, 55, 60, 289 R, 291; 73/114.01, 73/114.18, 760–860
See application file for complete search history.

(56) References Cited

U.S. PATENT DOCUMENTS

| 4,407,686 | A | | 10/1983 | Cook et al. | |
|---|---|---|---|---|---|
| 4,548,091 | A | * | 10/1985 | Norton | B62D 6/10 74/388 PS |
| 4,804,433 | A | | 2/1989 | Smith | |
| 5,051,056 | A | * | 9/1991 | Gibbons | B66C 23/48 248/201 |
| 5,767,416 | A | | 6/1998 | Conard | |
| 6,665,919 | B1 | * | 12/2003 | Kurtz | B25B 27/023 269/3 |
| 7,100,457 | B2 | | 9/2006 | Lee et al. | |
| 8,517,365 | B2 | * | 8/2013 | Velez | B25B 5/147 269/140 |
| 8,783,119 | B2 | * | 7/2014 | Little | F04D 29/563 73/147 |
| 2013/0113150 | A1 | * | 5/2013 | Velez | B25B 5/147 269/156 |

FOREIGN PATENT DOCUMENTS

SU 540133 11/1972

* cited by examiner

*Primary Examiner* — Monica Carter
*Assistant Examiner* — Nirvana Deonauth
(74) *Attorney, Agent, or Firm* — Rankin, Hill & Clark LLP (57) ABSTRACT A strain gage device and method for positioning and applying strain gages in vehicles includes an alignment jig for fixing a position relative to a cylinder bore in an engine block, a rotatable member selectively rotatable relative to the alignment jig to a desired angular position, and at least one arm pivotally mounted to the rotatable member for applying a strain gage to the engine block.

18 Claims, 8 Drawing Sheets

STRAIN GAGE DEVICE AND METHOD

BACKGROUND

Strain gages are used in a variety of applications. One common application is within a vehicle, and particularly in association with the engine block of the vehicle. Application of strain gages to very small confined spaces (e.g., small confined spaces within the engine block) can be extremely difficult and the resulting placement often has very low accuracy. A typical method of application of a strain gage to an engine block involves a technician applying an adhesive to a strain gage, positioning the gage in a desired position and then applying manual pressure until the adhesive has cured. This is a very manual process. Positioning of the gage is typically done by the technician visually determining where best to place the strain gage and therefore tends to be inconsistent as some level of subjectivity is imparted by the technician during the placement process. Sometimes the technician will use a block of clay or some other improvised tool to assist in applying the strain gage, particularly if being applied in a confined space.

This application method is limited because the technician cannot always fully reach the desired location even when using an improvised tool. Moreover, improvised tools often do not afford accuracy levels necessary for use of the resulting data. For example, in some applications, such as a cylinder block water jacket, the space is too confined for the technician to reach the desired location with his or her fingers or with existing improvised tools. Even in instances where the technician can reach the location, often the placement of the gage is inaccurate due to gage shift or slide when applying pressure.

SUMMARY

According to one aspect, a strain gage device for positioning and applying strain gages in vehicles includes an alignment jig for fixing a position relative to a cylinder bore in an engine block, a rotatable member selectively rotatable relative to the alignment jig to a desired angular position, and at least one arm pivotally mounted to the rotatable member for applying a strain gage to the engine block.

According to another aspect, a strain gage device for positioning and applying strain gages includes an alignment jig, a rotatable member and a pair of gage arms. The rotatable member is rotatably disposed within the alignment jig for rotating relative to the alignment jig to a desired angular position. Each of the pair of gage arms is pivotally connected to the rotatable member at diametrically opposed locations on the rotatable member. Rotation of the rotatable member relative to the alignment jig rotates the pair of gage arms relative to the alignment jig.

According to a further aspect, a strain gage mounting method for positioning and applying strain gages in a vehicle is provided. In accordance with this aspect, an alignment jig is positioned relative to a cylinder bore in an engine block. A rotatable member is rotated relative to the alignment jig to a desired angular position. At least one strain gage is applied to the engine block by pivotally moving at least one arm pivotally mounted to the rotatable member.

DETAILED DESCRIPTION

Figure 1A:
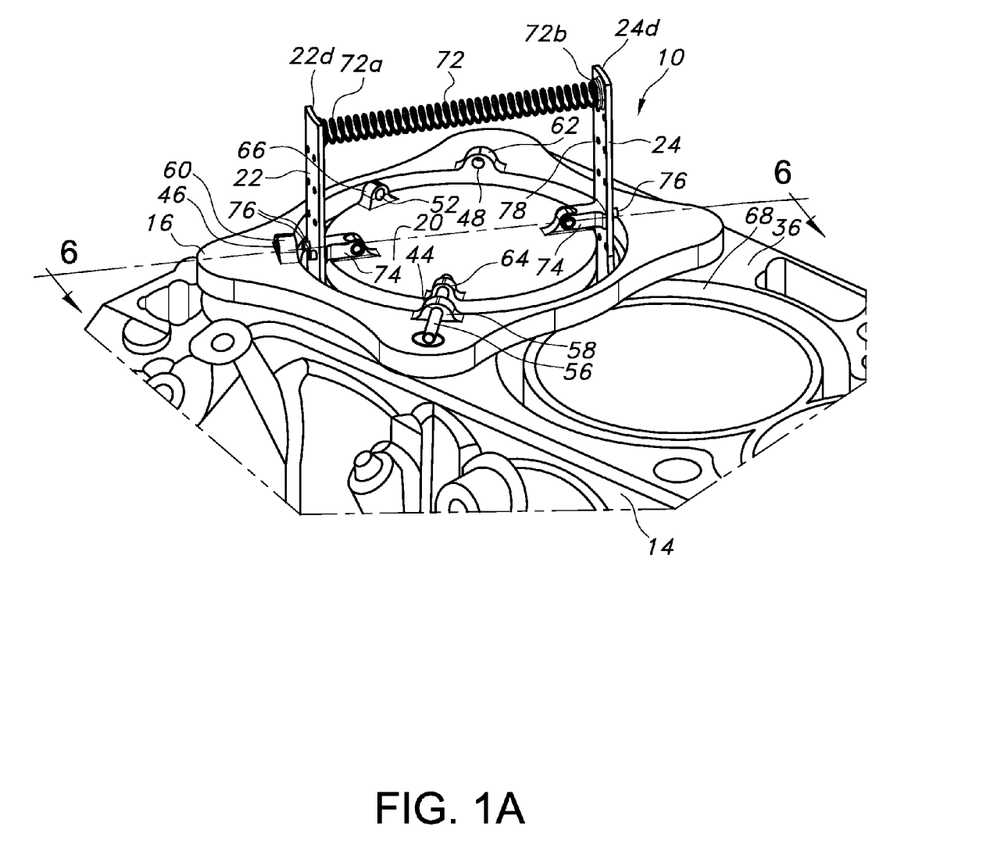
FIG. 1A is a partial perspective view showing a strain gage device positioned on an engine block according to an exemplary embodiment.
Figure 1B:
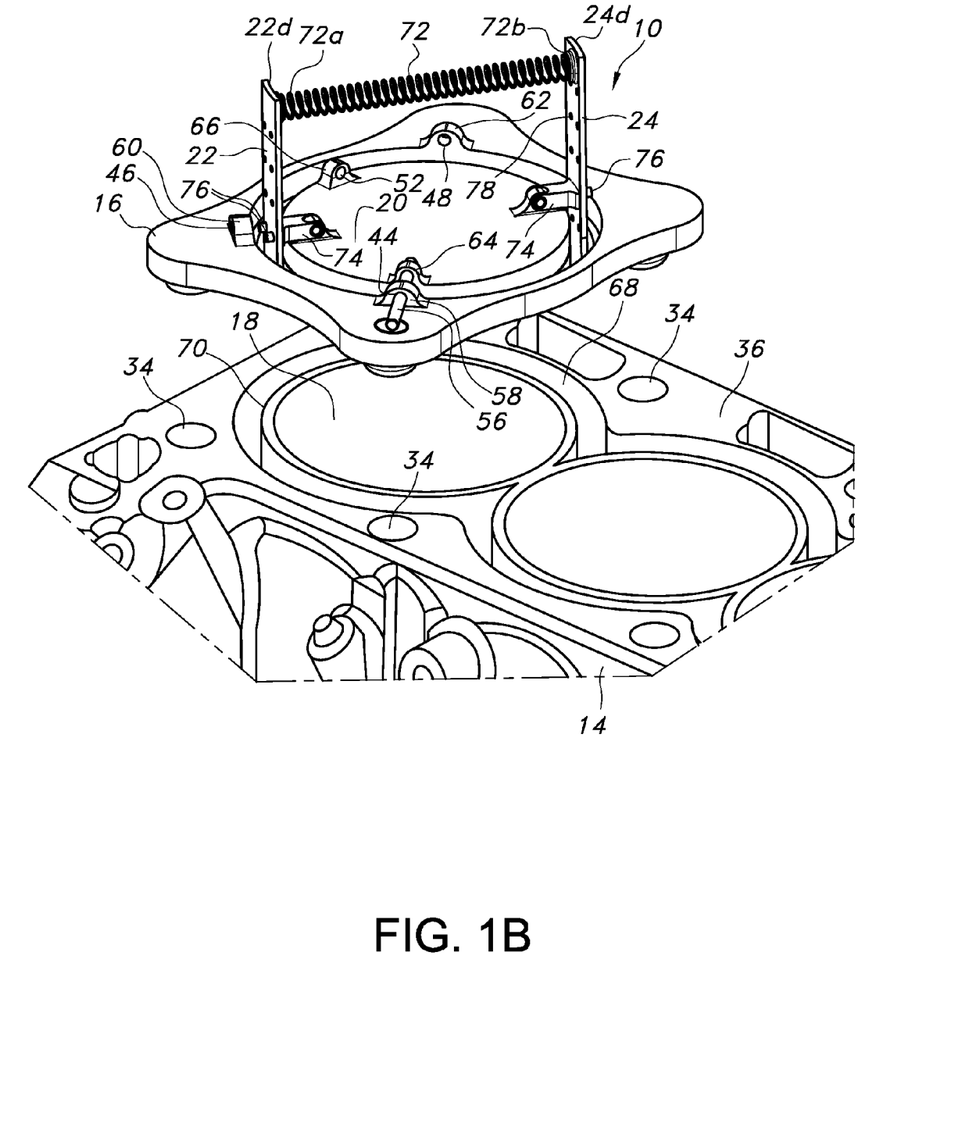
FIG. 1B is a partial perspective view similar to FIG. 1A but showing the strain gage device removed from the engine block.
Figure 3A:
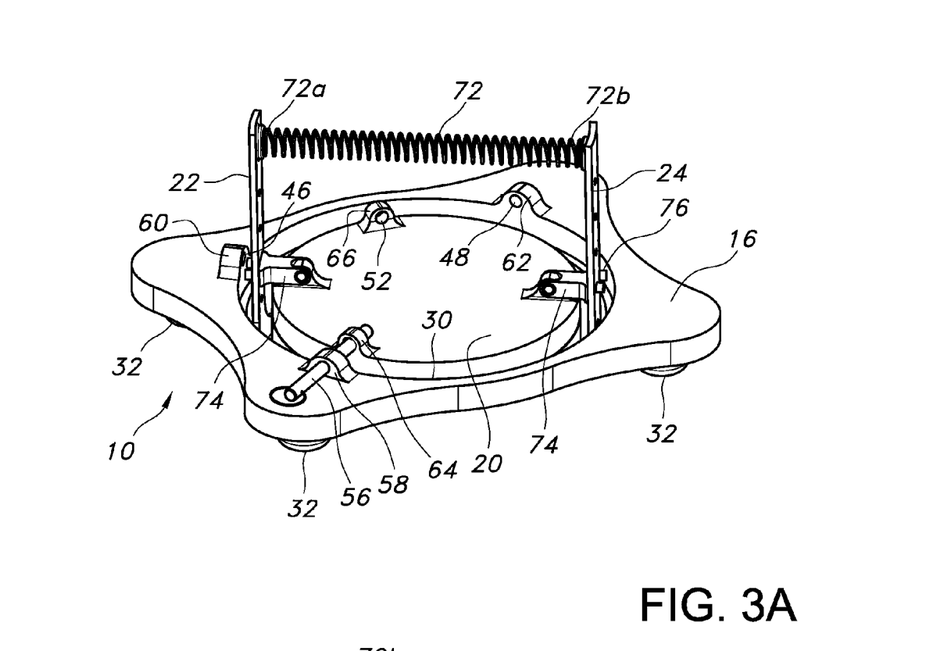
FIG. 3A is a perspective view of the strain gage device shown in isolation (i.e., removed from the engine block).
Figure 3B:
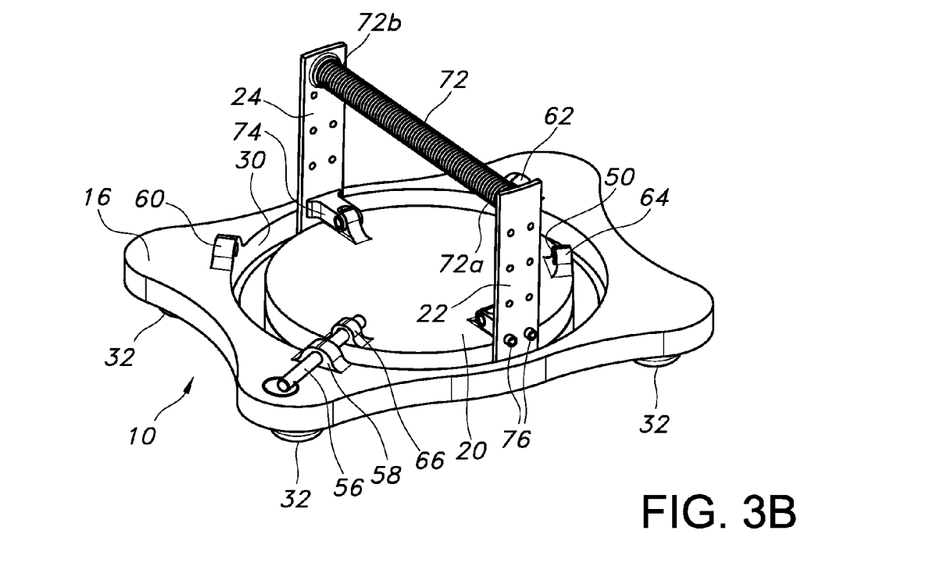
FIG. 3B is a perspective view of the strain gage device similar to FIG. 3A, but shown with a rotatable member of the device rotated relative to an alignment jig of the device.
Figure 6:
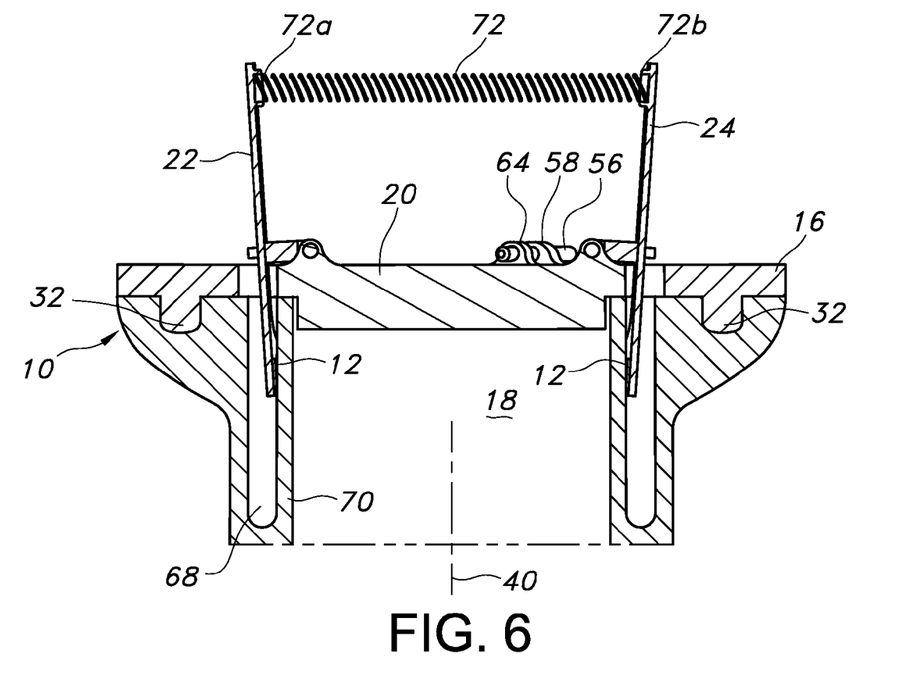
FIG. 6 is a cross-sectional view taken along the line 6-6 of FIG. 1.
Figure 7:
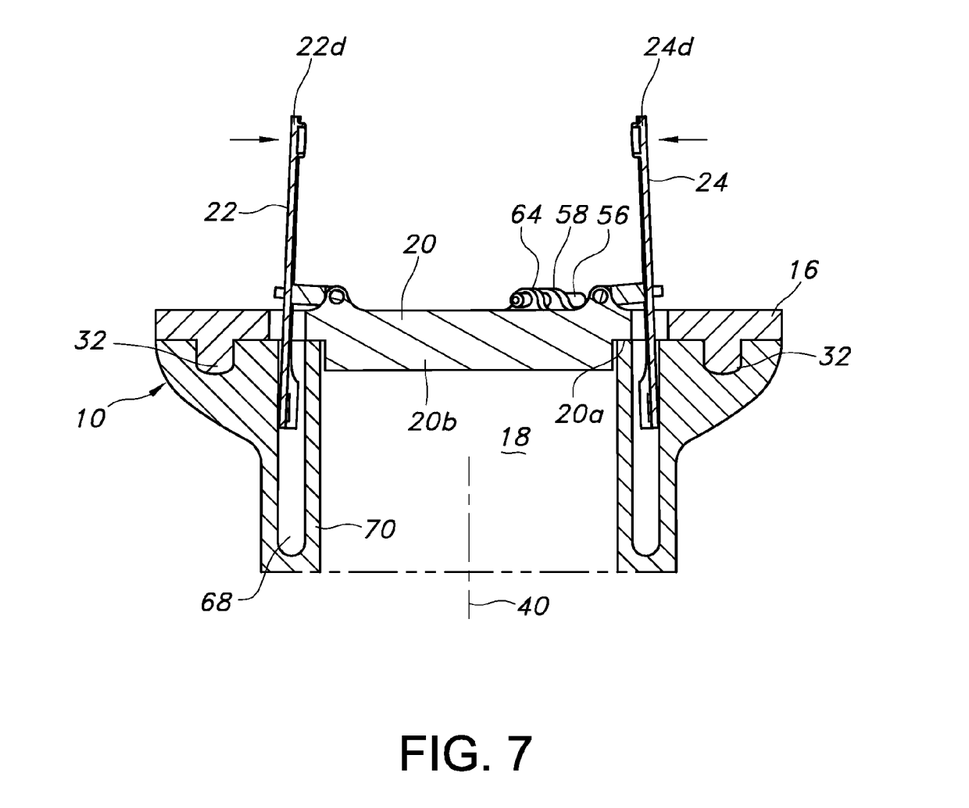
FIG. 7 is a cross-sectional view of the strain gage device similar to FIG. 6, but shown prior to a compression spring being secured to upper ends of the gage arms to urge the upper ends away from one another and thereby apply inward radial force to lower ends of the gage arms via the pivotal connection of the gage arms to the rotatable member.

Referring now to the drawings wherein the showings are for purposes of illustrating one or more exemplary embodiments and not for purposes of limiting the same, a strain gage device for positioning and applying strain gages in vehicles is shown and generally illustrated by reference numeral 10. As best shown in FIG. 1, and as will be described in more detail below, the strain gage device 10 can be used to apply strain gages (e.g., strain gage 12 shown in FIG. 5) to an engine block 14 of a vehicle (not shown). The strain gage device 10 includes an alignment jig 16 for fixing a position relative to a cylinder bore (e.g., cylinder bore 18 shown in FIGS. 6 and 7) in the engine block 14 and a rotatable member 20 selectively rotatable relative to the alignment jig 16 to a desired angular position. In particular, and as best shown in FIGS. 3A and 3B, the rotatable member 20 is rotatably disposed within the alignment jig 16 for rotating relative to the alignment jig 16 to the desired angular position.

The strain gage device 10 further includes at least one arm (e.g., gage arms 22, 24 in the illustrated embodiment) pivotally mounted to the rotatable member 20 for applying a strain gage (e.g., strain gage 12) to the engine block 14. In the illustrated embodiment, the at least one arm is a pair of arms 22, 24 (also referred to herein as gage arms) pivotally mounted to the rotatable member 20 at diametrically opposite locations on the rotatable member 20. By this arrangement, rotation of the rotatable member 20 relative to the alignment jig 16 rotates the pair of gage arms 22, 24 relative to the alignment jig 16.

The alignment jig 16 includes a central circular aperture 30 defined therein. In the illustrated embodiment, the rotatable member 20 is generally cylindrical and is rotatably received within the central circular aperture 30 of the alignment jig 16. The alignment jig 16 includes at least one underside protrusion received within at least one mounting aperture of the engine block 14 to position the alignment jig 16 relative to the cylinder bore 18. More particularly, in the illustrated embodiment, the at least one underside protrusion is a plurality of underside protrusions 32 with each disposed at a respective corner of the alignment jig 16 (e.g., four underside protrusions 32 in the illustrated embodiment, though only three are illustrated). Likewise, the at least one mounting aperture of the illustrated embodiment is a plurality of mounting apertures 34 disposed around the cylinder bore 18 in an upper surface 36 of the engine block 14 (e.g., four corresponding mounting apertures 34 in the illustrated embodiment, though only one is shown).

Figure 2:
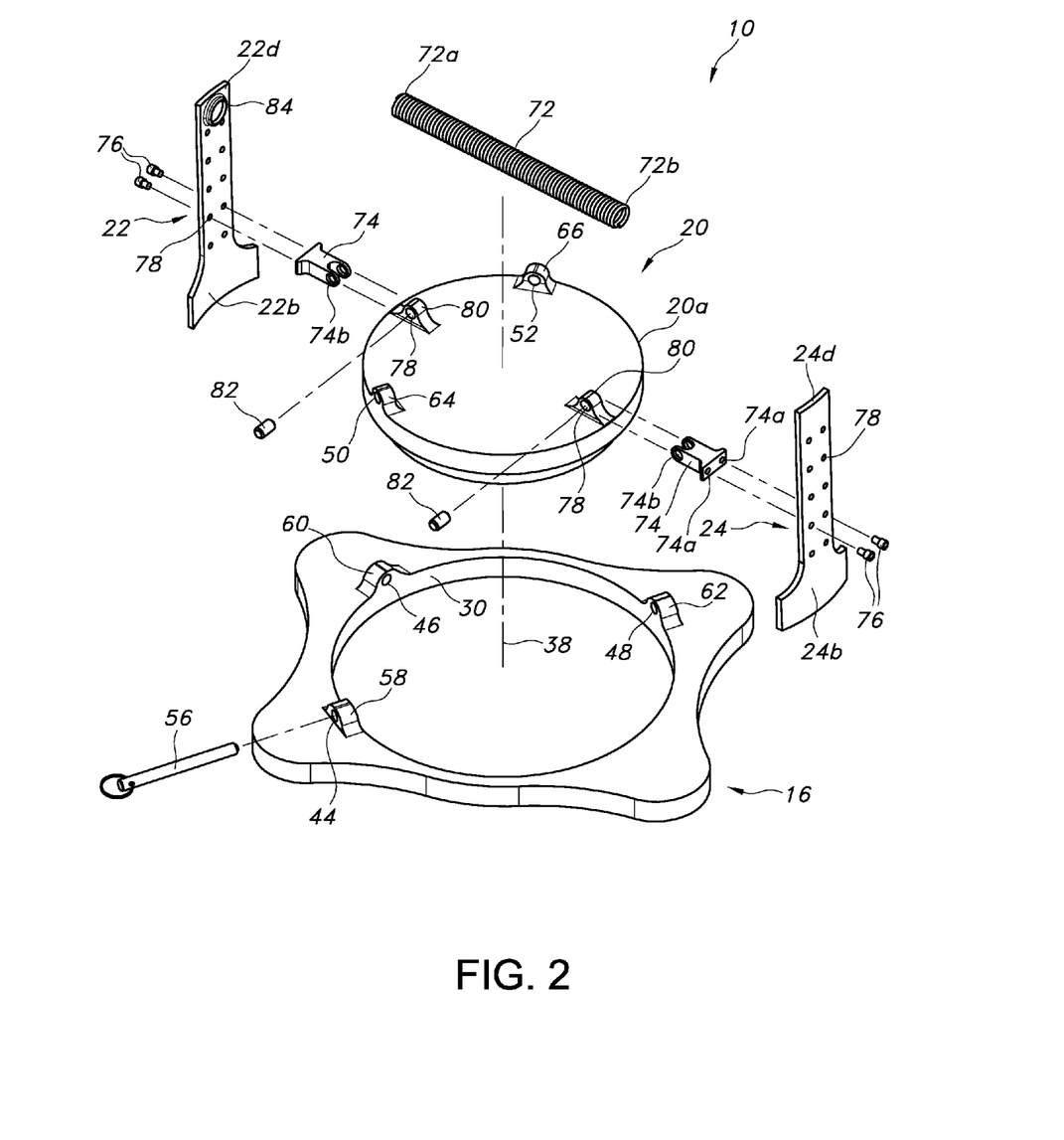
FIG. 2 is an exploded perspective view of the strain gage device of FIG. 1.

To fix the position of the alignment jig 16 on the engine block 14, and particularly relative to the cylinder bore 18 of the engine block 14, the plurality of underside protrusions 32 are received or inserted within the corresponding mounting apertures 34 thereby aligning an alignment jig axis 38 (FIG. 2) with a center line axis 40 (see FIGS. 6 and 7) of the cylinder bore 18. Within the alignment jig 18, the rotatable member 20 is rotatable about the alignment jig axis 38. The corresponding mounting apertures 34 can be the head stud threaded holes or apertures conventionally provided on the engine block 14 in association with or proximate to the cylinder bore 18.

At least one of the alignment jig 16 and the rotatable member 18 is structurally configured to selectively lock an angular position of the rotatable member 20 to the desired angular position and inhibit rotation of the rotatable member 20, and thereby the gage arms 22, 24, relative to the alignment jig 16. More particularly, the strain gage device 10 can include a locking device for locking an angular position of the rotatable member 20 relative to the alignment jig 16. The locking device can include at least one alignment jig aperture (e.g., alignment apertures 44, 46, 48) defined by the alignment jig 16 and at least one rotatable member aperture (e.g., rotatable member apertures 50, 52) defined by the rotatable member 20. In the illustrated embodiment, the at least one alignment jig aperture is a plurality of alignment jig apertures 44, 46, 48 disposed in circumferentially spaced relation to one another about the central circular aperture 30 of the alignment jig 16 and the at least one rotatable member aperture is a plurality of rotatable member apertures disposed in circumferentially spaced relation to one another adjacent or on a peripheral radial edge 20a of the rotatable member. More specifically, there are three alignment jig apertures 44, 46, 48 and two rotatable member apertures 50, 52 in the illustrated embodiment, but any number of alignment jig apertures could be provided and likewise any number of rotatable member apertures could be provided.

Advantageously, the rotatable member 20 is rotatable, particularly relative to the alignment jig 16, to position the at least one rotatable member aperture of the rotatable member 20 in registry with the at least one alignment jig aperture of the alignment jig 16. Additionally, the locking device can include an angular alignment pin 56 receivable through the at least one alignment jig aperture and the at least one rotatable member aperture when in registry with one another to lock the angular position of the rotatable member relative to the alignment jig 16 (e.g., through apertures 44 and 50 as shown in FIG. 1). Since the alignment jig 16 can be fixed in position relative to the engine block 14, and particularly relative to the cylinder bore 18 of the engine block 14, locking the angular position of the rotatable member 20 relative to the alignment jig 16 also fixes the position of the rotatable member 20 relative to the engine block 14, and particularly to the cylinder bore 18 of the engine block 14.

More specifically, in the illustrated embodiment, the alignment jig 16 includes alignment jig raised structures 58, 60, 62 respectively defining the alignment jig apertures 44, 46, 48. The rotatable member 20 can likewise include rotatable member raised structures 64, 66 respectively defining the rotatable member apertures 50, 52 therein. In operation, either of the rotatable member apertures 50, 52 defined by the raised structures 64, 66 can be rotated so as to be in registry with one of the apertures 44, 46, 48 defined by the raised structures 58, 60, 62 of the alignment jig 16 thereby positioning one of the apertures 50, 52 in registry with one of the apertures 44, 46, 48 of the alignment jig 16 for receipt of the pin 56 to lock the angular position of the rotatable member 20 relative to the alignment jig 16.

Figure 4A:
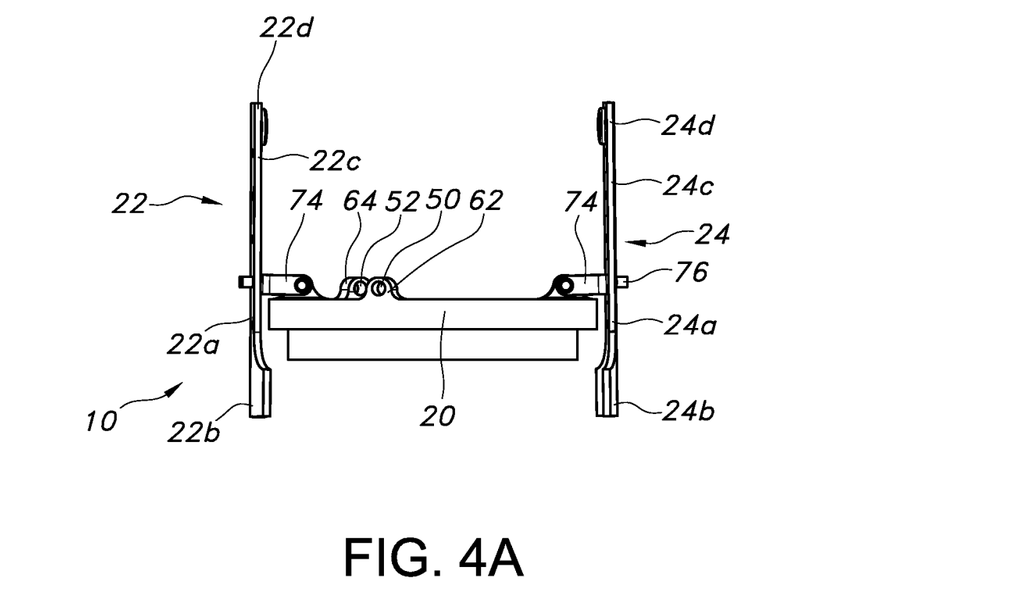
FIG. 4A is a side elevation view of the rotatable member shown with gage arms pivotally attached thereto at a first vertical position.
Figure 4B:
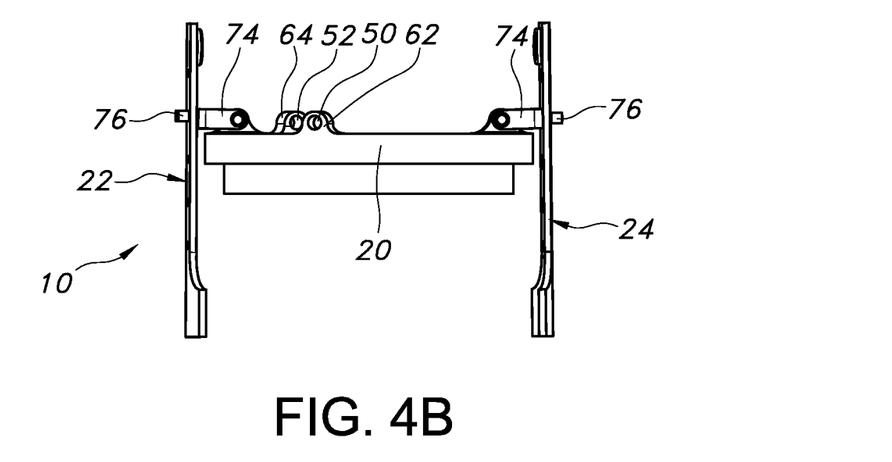
FIG. 4B is a side elevation view of the strain gage device similar to FIG. 4A, but shown with gage arms attached at a second vertical position.

With reference to FIGS. 4A and 4B, the gage arms 22, 24 each include a lower arm portion 22a, 24a having a lower end 22b, 24b spaced apart in a first direction (e.g., downwardly in FIGS. 4A and 4B) relative to the rotatable member 20, or at least relative to a location at with the arms 22, 24 are pivotally connected to the rotatable member 20, and an upper arm portion 22c, 24c having an upper end 22d, 24d spaced apart in a second, opposite direction (e.g., upward in FIGS. 4A and 4B) relative to the rotatable member 20, or at least relative to the location at which the arms 22, 24 are pivotally connected to the rotatable member 20.

Figure 5:
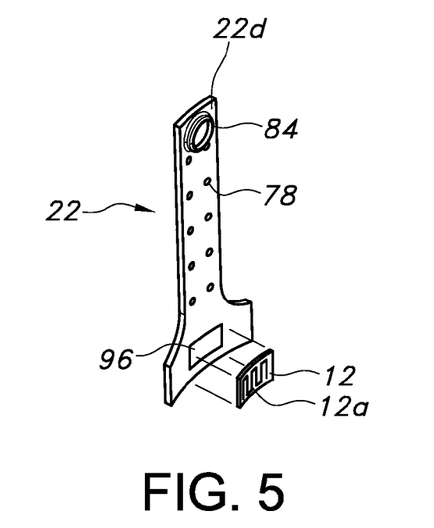
FIG. 5 is a perspective view of one of the gage arms shown in isolation with a strain gage being temporarily affixed thereto.

The lower ends 22b, 24b are particularly configured to have strain gages, such as strain gage 12 shown in FIG. 5, temporarily affixed thereto and further configured to apply inward radial force against the strain gages to mount the strain gages. For example, as shown in the illustrated embodiment, the gage arms 22, 24 can each have a relatively thin profile that is thin enough to enable insertion of the lower ends 22b, 24b into tight spaces. In this manner, the lower arm portions 22a, 24a can be configured (as shown in the illustrated embodiment) to insert into a water jacket passageway 68 defined in the engine block 14 around a cylinder sleeve structure 70 that defines the cylinder bore 18 in the engine block 14. As shown, the lower arm portions 22a, 24a, and particularly at or adjacent the lower ends 22b, 24b, can have curved configurations that are complementary to a curvature of the cylinder sleeve structure 70 and/or can have increased widths for accommodating a strain gage thereon.

The upper ends 22d, 24d can be configured for attachment to a spring 72. More particularly, the spring 72 can have a first end 72a connected to the upper end of one of the pair of arms (i.e., the upper end 22d of the gage arm 22) and a second end 72b connected to the upper end of the other of the gage arms (i.e., the upper end 24d of the gage arm 24). The spring 72 can be a compression spring that applies a converging force on the gage arms 22, 24, and particularly on the upper ends 22d, 24d of the gage arms 22, 24, to pull or urge the upper ends 22d, 24d of the gage arms 22, 24 toward one another and thereby, via the pivotal connection to the rotatable member 20, urge the lower arm portions 22a, 24a, and particularly the lower ends 22b, 24b, radially inwardly for mounting strain gages (e.g., strain gage 12) to the engine block 14. More specifically, and particular to the illustrated embodiment, the upper ends 22d, 24d can include annular protrusions 74 (FIG. 2) for connecting to and accommodating the ends 72, 72b of the spring 72.

The pivot location at which each of the gage arms 22, 24 is pivotally mounted to the rotatable member 20 is adjustable on the respective gage arm 22 or 24 to vary a vertical position of the gage arm 22 or 24 relative to the rotatable member 20. More particularly, in the illustrated embodiment, each of the gage arms 22, 24 is pivotally mounted to the rotatable member by a pivot arm member 74 that can be connected to the respective pivot arm 22 or 24 via a suitable fastener 76. More specifically, the fasteners 76 can be received through desired apertures 78 defined along a longitudinal extent of the gage arm 22 or 24 to connect the gage arm to the pivot arm member 74. For example, in the illustrated embodiment, the apertures 78 are provided in sets of two and the sets of two are provided at vertically spaced apart locations along each of the gage arms 22, 24. In particular, there are five sets of apertures 78 shown in the illustrated embodiment, but any number of sets of apertures 78 could be used. In addition, each set could include only one or more than two apertures 78. In the illustrated embodiment, the fasteners 76 are received through a desired set of apertures 78 and then inserted, such as threadedly, into receiving apertures 74a defined in the pivot arm member 74.

The pivot member 74 can itself be pivotally secured to the rotatable member 20 via pivot holes 74b defined by the pivot arm member 74 being put in registry with an aperture 78 defined by the rotatable member 20. In particular, the aperture 78 can be defined by a raised structure 80 on the rotatable member 20. A pivot pin 82 can be inserted through the aperture 78 and the apertures 74b when in registry with one another to pivotally connect the pivot arm member 74 to the rotatable member 20 and thereby the gage arm secured to the pivot arm 74 to the rotatable member 20.

Figure 8:
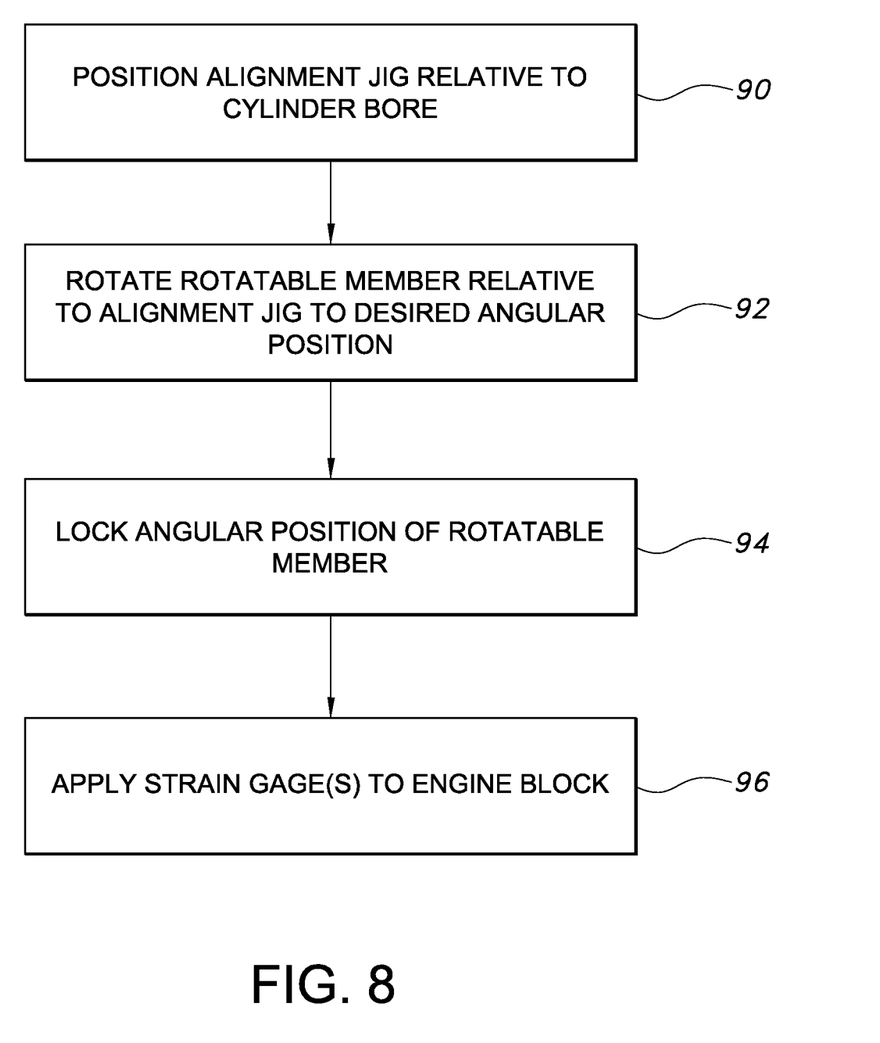
FIG. 8 is a process flow diagram illustrating a strain gage mounting method according to an exemplary embodiment.

With additional reference now to FIG. 8, a strain gage mounting method will now be described. In particular, the strain gage mounting method of FIG. 8 will be described in association with the strain gage device 10 discussed hereinabove, though it will be appreciated by those skilled in the art that the method could be used with other instrument positioning devices and need not be limited to the device 10 discussed herein. In the method, the alignment jig 16 is first positioned relative to the cylinder bore 18 in the engine block 14 at 90. Such positioning can include inserting the underside protrusions 32 in the corresponding mounting apertures 34 defined in the upper surface 36 of the engine block 14. Next, the rotatable member 20 can be rotated relative to the alignment jig 16 to a desired angular position at 92. This step can also include axially inserting the rotatable member 20 into the central circular aperture 30 of the alignment jig 16. In the illustrated embodiment, axial relative positioning can be obtained by the underside protrusions 32 being fully received in the mounting apertures 34. This sets the position of the alignment jig relative to the cylinder bore 18, including a relative radial position, a relative axial position and a relative angular position.

The rotatable member 20 can be axially inserted into the central circular aperture 30 of the alignment jig 16 and can have an underside protuberance 20 inserted into the cylinder bore 18 defined by the cylinder sleeve structure 70 until a shoulder portion 70c of the rotatable member 20 rests against the cylinder sleeve structure 70. This sets the position of the rotatable member relative to the alignment jig 16 and relative to the cylinder bore 18, including a relative radial position and a relative axial position. Since the rotatable member 20 is rotatable relative to the alignment jig 16, the rotatable member 20 can be rotated as desired to the desired angular position. In one embodiment, the desired angular position can be one in which one of the rotatable member apertures 50 or 52 aligns in registry with one of the alignment jig apertures 58, 60 or 62. The angular position of the rotatable member 20 can then be locked at 94 relative to the alignment jig and thereby relative to the cylinder bore 20 by inserting the pin 56 through the aligned apertures. This also locks the angular position of the gage arms 22, 24 relative to the alignment jig 16 and the cylinder bore 18. The pin 56 also further locks the relative axial position of the rotatable member 20 to the alignment jig 16.

Prior to the rotatable member 20 being axially inserted into the alignment jig 16 and the cylinder bore 18, the gage arms 22, 24 can be adjusted to a desired vertical position. In particular, the fasteners 76 can be inserted through a desired set of the apertures 78 on the gage arms 22, 24 and threaded to the pivot arm member 74. Also, strain gages 12 are temporarily fixed to the lower ends 22b, 24b of the gage arms 22, 24. In particular, and as is known and understood by those skilled in the art, a curing type adhesive (not shown) can be applied to an exposed side (e.g., side 12a in FIG. 5) of the strain gage and reduced strength adhesive (e.g., illustrated double-sided tape 96) can be applied to an opposite side for temporarily fixing the strain gage to the respective gage arm 22 or 24. During installation of the rotatable member 20, and with reference to FIG. 7, slight inward radial force can be applied to the upper ends 22d, 24d of the gage arms 22, 24 to maintain the lower ends 22b, 24d and the strain gages 12 applied thereto in spaced radial relation relative to the cylinder sleeve structure 70.

Once in position, the stain gages 12 on the gage arms 22, 24 can be applied to the engine block 14 at 98, and particularly to the cylinder sleeve structure 70, by pivotally moving the gage arms 22, 24. the upper ends 22d, 24d can be moved radially apart to urge the lower ends 22b, 24b radially inwardly to apply the strain gages 12 to the cylinder sleeve structure 70. The spring 72 can be affixed to the upper ends 22d, 24d to continuously urge the upper ends 22d, 24d radially outwardly without the need for manual application of force. This urges the lower ends 22b, 24b radially inwardly to attach the strain gages 12 to the cylinder sleeve structure 70 and maintain pressure against the strain gages 12 until the cure type adhesive sets and/or is cured.

After curing, the stain gages 12 are fixed to the cylinder sleeve structure 12. The spring 72 can then be removed and the gage arms 22, 24 pivoted away from the strain gages 12. The cure type adhesive, after setting, is stronger than the double-sided tape 96 and so the gage arms 22, 24 are pulled apart from the strain gages 12. The pin 56 can then be removed and then the rotatable member 20 with the gage arms 22, 24 can be pulled from the cylinder bore 18 and the alignment jig 16.

The strain gage device 10 and the strain gage mounting method described herein advantageously enable strain gages (e.g., the strain gage 12) to be accurately positioned and mounted, particularly into confined spaced where manual placement is not feasible and/or accurate. The stain gage device 10 specifically can fix the location of the applied strain gages 12 in three directions (i.e., axially, radially and angularly). The improved accuracy enables measured results taken from the mounted stain gages to be compared directly with computer simulation results at the same locations. Also, the time necessary for placing the strain gages 12 is reduced as a technician is no longer required to manually apply pressure for an extended period while adhesive on the strain gages cures. Finally, it should be appreciated that the strain gage device 10 and stain gage mounting method described herein need not be limited to the mounting of strain gages but could be used in association with any other instrumentation that is to be mounted within a confined space.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:
1. A strain gage device for positioning and applying strain gages in vehicles, comprising:
an alignment jig for fixing a position relative to a cylinder bore in an associated engine block;
a rotatable member selectively rotatable relative to the alignment jig to a desired angular position; and
at least one arm pivotally mounted to the rotatable member for applying a strain gage to the associated engine block, the at least one arm having at least one end spaced apart from the rotatable member for carrying the strain gage, the at least one arm pivotable about the rotatable member to radially move the at least one end relative to an axis of rotation of the rotatable member for applying the strain gage at a location spaced apart axially from the rotatable member; and
a locking device for locking an angular position of the rotatable member relative to the alignment jig, wherein the locking device includes:
at least one alignment jig aperture defined by the alignment jig;
at least one rotatable member aperture defined by the rotatable member, wherein the rotatable member is rotatable to position the at least one rotatable member aperture in registry with the at least one alignment jig aperture; and
a pin receivable through the at least one alignment jig aperture and the at least one rotatable member aperture when in registry with one another to lock the angular position of the rotatable member relative to the alignment jig, and
wherein the at least one alignment jig aperture is a plurality of apertures disposed in circumferentially spaced relation to one another about a central circular aperture defined by the alignment jig in which the rotatable member is received.

2. The strain gage device of claim 1 wherein the alignment jig includes a circular aperture defined therein, and wherein the rotatable member is generally cylindrical and is received within and rotatable within the circular aperture of the alignment jig.

3. The strain gage device of claim 1 wherein the alignment jig includes at least one underside protrusion complementarily receivable within at least one aperture of the associated engine block to position the alignment jig relative to the cylinder bore, the at least one underside protrusion sized to complementarily fit within the at least one aperture of the associated engine block.

4. The strain gage device of claim 3 wherein the at least one underside protrusion is a plurality of underside protrusions and the at least one aperture is a plurality of mounting apertures disposed in an upper surface of the associated engine block around the cylinder bore, and wherein receipt of the plurality of underside protrusions within the plurality of mounting apertures aligns an alignment jig axis of alignment jig with a center line axis of the cylinder bore, the rotatable member rotatable about the alignment jig axis.

5. The strain gage device of claim 1 wherein at least one of the alignment jig and the rotatable member is structurally configured to selectively lock an angular position of the rotatable member to the desired angular position and inhibit rotation of the rotatable member relative to the alignment jig.

6. The strain gage device of claim 1, wherein the at least one rotatable member aperture is a plurality of apertures disposed in circumferentially spaced relations to one another adjacent or at a peripheral radial edge of the rotatable member.

7. The strain gage device of claim 1 wherein the at least one arm is a pair of arms pivotally mounted to the rotatable member at diametrically opposite locations.

8. The strain gage device of claim 7 wherein the at least one end is a pair of lower ends and wherein the pair of arms each include a lower arm portion having one of the pair of lower ends that is spaced apart in a first direction relative to the rotatable member and an upper arm portion having an upper end spaced apart in a second, opposite direction relative to the rotatable member.

9. The strain gage device of claim 8 wherein the lower arm portion is configured to insert into a water jacket passageway defined in the associated engine block around a cylinder sleeve structure defining the cylinder bore.

10. The strain gage device of claim 9 wherein the lower arm portion has a curved configuration complementary to a curvature of the cylinder sleeve structure.

11. A strain gage device for positioning and applying strain gages in vehicles, comprising:
an alignment jig for fixing a position relative to a cylinder bore in an associated engine block;
a rotatable member selectively rotatable relative to the alignment jig to a desired angular position;
at least one arm pivotally mounted to the rotatable member for applying a strain page to the associated engine block, the at least one arm having at least one end spaced apart from the rotatable member for carrying the strain gage, the at least one arm pivotable about the rotatable member to radially move the at least one end relative to an axis of rotation of the rotatable member for applying the strain gage at a location spaced apart axially from the rotatable member, wherein the at least one arm is a pair of arms pivotally mounted to the rotatable member at diametrically opposite locations; and
a spring having one end connected to the upper end of one of the pair of arms and another end connected to the upper end of the other of the pair of arms, the spring applying a force on the pair of arms to push the upper ends of the pair of arms away from one another and thereby urge the lower arm portions radially inwardly for mounting strain gages to the associated engine block.

12. The strain gage device of claim 1 wherein a pivot location at which the at least one arm is pivotally mounted to the rotatable member is adjustable on the at least one arm to vary a vertical position of the at least one arm relative to the rotatable member.

13. A strain gage device for positioning and applying strain gages, comprising:
an alignment jig;
a rotatable member rotatably disposed within the alignment jig for rotating relative to the alignment jig to a desired angular position;
a pair of gage arms each pivotally connected to the rotatable member at diametrically opposed locations on the rotatable member, wherein rotation of the rotatable member relative to the alignment jig rotates the pair of gage arms relative to the alignment jig; and
a spring connected to upper ends of the pair of gage arms, the spring applying a force on the pair of gage arms to push the upper ends apart and thereby urge lower ends of the arms radially inwardly toward one another.

14. The strain gage device of claim 13 wherein lower ends of the pair of gage arms are configured to have strain gages temporarily affixed thereto and further configured to apply inward radial force against the strain gages to mount the strain gages.

15. A strain gage mounting method for positioning and applying strain gages in a vehicle, comprising:
    positioning an alignment jig relative to a cylinder bore in an associated engine block;
    rotating a rotatable member relative to the alignment jig to a desired angular position;
    applying at least one strain gage to the associated engine block by pivotally moving at least one arm pivotally mounted to the rotatable member, and
    urging a lower end of the at least one arm in a radially inward direction via a spring force applying to an upper end of the at least one arm.

16. The strain gage mounting method of claim 15 further including:
    locking an angular position of the rotatable member relative to the alignment jig.

17. The strain gage device of claim 11 further including a locking device for locking an angular position of the rotatable member relative to the alignment jig, the locking device including:
    at least one alignment jig aperture defined by the alignment jig;
    at least one rotatable member aperture defined by the rotatable member, wherein the rotatable member is rotatable to position the at least one rotatable member aperture in registry with the at least one alignment jig aperture; and
    a pin receivable through the at least one alignment jig aperture and the at least one rotatable member aperture when in registry with one another to lock the angular position of the rotatable member relative to the alignment jig, and
    wherein the at least one alignment jig aperture is a plurality of apertures disposed in circumferentially spaced relation to one another about a central circular aperture defined by the alignment jig in which the rotatable member is received.

18. The strain gage device of claim 7 further including:
    a spring having one end connected to the upper end of one of the pair of arms and another end connected to the upper end of the other of the pair of arms, the spring applying a force on the pair of arms to push the upper ends of the pair of arms away from one another and thereby urge the lower arm portions radially inwardly for mounting strain gages to the associated engine block.

* * * * *